C. L. GOUGHNOUR.
ELECTRIC MOTOR STARTER.
APPLICATION FILED APR. 19, 1911.

1,012,198.

Patented Dec. 19, 1911.
2 SHEETS—SHEET 1.

Witnesses:
R. F. Kohl
Mary A. Cavanaugh

Inventor:
Charles L. Goughnour,
By Harry Frease
Attorney

C. L. GOUGHNOUR.
ELECTRIC MOTOR STARTER.
APPLICATION FILED APR. 19, 1911.

1,012,198.

Patented Dec. 19, 1911.
2 SHEETS—SHEET 2.

Witnesses:
R. J. Kohl
Mary A. Cavanaugh

Inventor:
Charles L. Goughnour,
By Harry Frease,
Attorney

UNITED STATES PATENT OFFICE.

CHARLES L. GOUGHNOUR, OF CANTON, OHIO, ASSIGNOR TO THE UNITED ELECTRIC COMPANY, OF CANTON, OHIO, A CORPORATION OF OHIO.

ELECTRIC-MOTOR STARTER.

1,012,198.

Specification of Letters Patent.

Patented Dec. 19, 1911.

Application filed April 19, 1911. Serial No. 622,056.

*To all whom it may concern:*

Be it known that I, CHARLES L. GOUGHNOUR, a citizen of the United States, residing at Canton, in the county of Stark and State of Ohio, have invented a certain new and useful Improved Electric-Motor Starter, of which the following is a specification.

The improvement relates to a starter for a single-phase alternating-current motor, and the object of the improvement is to provide a starting device of simple parts which will be readily accessible and will have a minimum of frictional resistance. These general objects, and other ancillary advantages, are attained by the mechanism, construction and arrangement illustrated, for a preferred embodiment of the invention, in the accompanying drawings, forming part hereof, in which—

Figure 1:
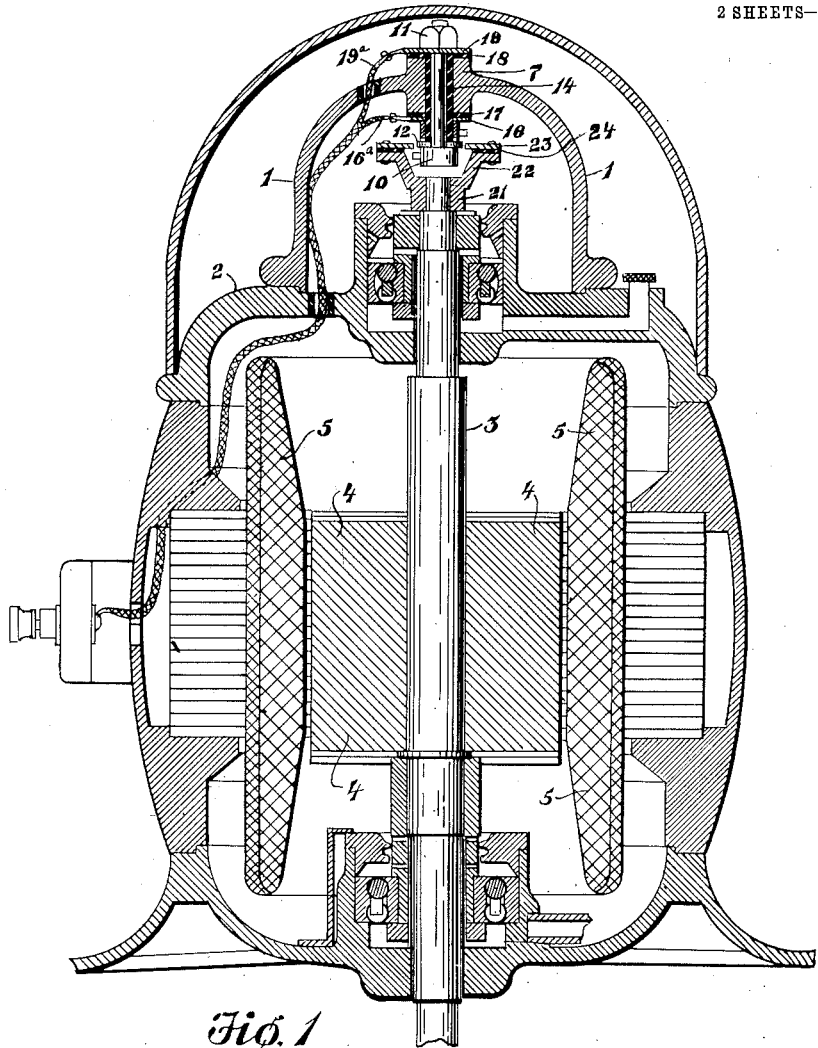
Figure 2:
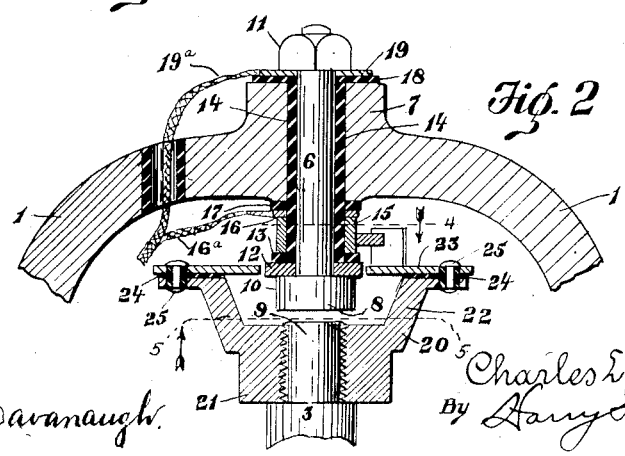
Figure 5:
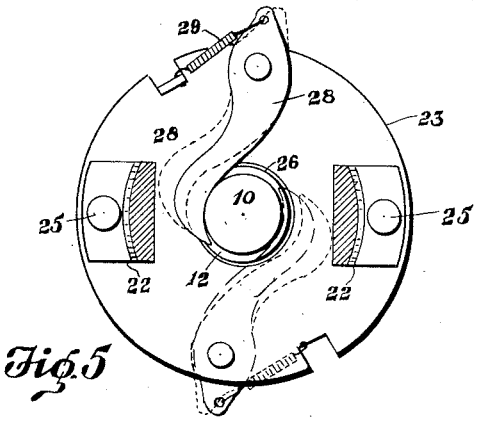
Figure 3:
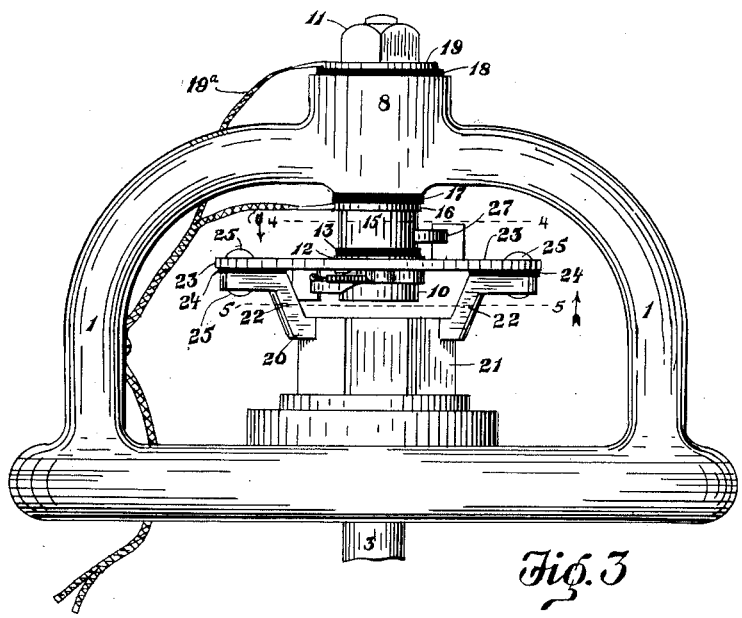
Figure 4:
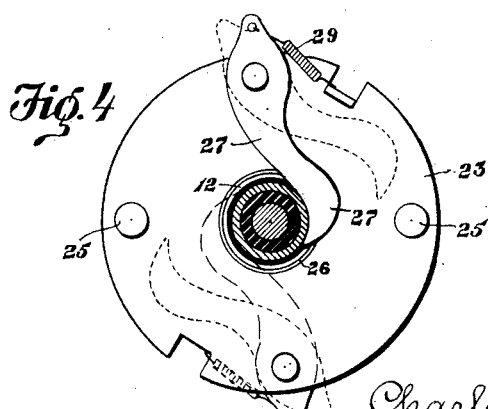

Figure 1 is a vertical section of an electric motor, showing the starting device thereon; Fig. 2, an enlarged section of the starting device; Fig. 3, a side elevation of the starting device; Fig. 4, a section on line 4—4, Figs. 2 and 3, showing a plan of the insulated disk; and Fig. 5, a section on line 5—5, Figs. 2 and 3, showing an under plan view of the insulated disk.

Similar numerals refer to similar parts throughout the drawings.

The fixed parts of the starting devices are secured in the bracket 1 mounted on the upper end of the motor case 2, in which motor case is journaled the spindle 3 of the rotor 4, and in which case is also secured the stator 5. The stem 6 of the starter is mounted in the hub 7 of the bracket 1, in co-axial alinement with the spindle 3 of the rotor; and the inner end 8 of the stem is located adjacent to and beyond the end 9 of the rotor spindle. The starter stem 6 is preferably made in the form of a bolt having the cylindric head 10 on the inner end and the ordinary nut 11 on the outer end; and the fixed parts of the starter are assembled on the bolt-stem, beginning with the collar 12 next to the cylindric head, the inner insulation washer 13 next to the collar, and then the insulation tube 14, which tube incloses the bolt stem from the inner insulation washer 13 to the outer end of the bracket hub 7. The metallic cylindric sleeve 15 is then telescoped around the inner end of the insulation tube, with its inner end against the inner insulation washer 13; and the inner terminal washer 16 is located against the outer end of this sleeve and is connected with one terminal wire 16ª of the starting winding of the stator. The intermediate insulation washer 17 is located around the insulation tube between the inner terminal washer 16 and the inner end of the bracket hub 7, thus completely insulating the cylindric sleeve 15. The outer insulation washer 18 is located around the bolt stem and against the outer ends of the insulation tube 14 and the bracket hub 7, and the outer terminal washer 19 is located between the outer insulation washer and the nut 11 of the bolt-stem; which terminal washer is connected with the other terminal wire 19ª of the starting winding of the stator. All the fixed parts thus described and the bracket hub are securely clamped together on the bolt-stem between its head and the nut. By this construction and arrangement of the parts, it is evident that the insulated sleeve 15 is in conducting connection with one terminal wire of the starting winding and thus becomes a cylindric terminal thereof; and that the insulated cylindric head 10 of the bolt-stem is in conducting connection with the other terminal wire of the starting winding, and thus becomes a cylindric terminal thereof, adjacent to but insulated from the cylindric sleeve terminal; and finally that each cylindric terminal has a free external periphery.

The bracket 20 is secured on the upper end of the rotor spindle, and as shown the body of this bracket is preferably made in the form of the nut 21, screwed on the upper end 9 of the spindle; on which nut are provided the upwardly extending and preferably integral arms 22, on which arms is secured a plate as the disk 23 with the intervening insulation washer 24, as by means of the insulated bolts or rivets 25. The disk 23, thus insulated, is provided with the central aperture 26 which clears around the periphery of the fixed collar 12 of the starter.

The centrifugal dog 27 is pivoted or otherwise movably secured on the upper side of the insulated disk 23, and the centrifugal dog 28 is likewise secured on the lower side thereof, each dog having its outer end connected to the disk by means of a spring, as the coil spring 29, acting to normally hold the inner end of the dogs inward; the inner end of the upper dog 27 being normally held against the free external periphery of the cylindric sleeve terminal 15, and the inner end of the lower dog 27 being normally held against the free external periphery of the cylindric head terminal 10 of the bolt-stem. It is evident that when the dogs are thus normally held against the peripheries of the cylindric terminals, the circuit of the starting winding will be closed between these terminals through the insulated disk 23. And it is also evident that a rotation of the insulated disk 23, with the rotor spindle 3 to which it is secured, will tend to throw the inner ends of the dogs 27 and 28 outward by centrifugal force; and, that when this force is sufficient to overcome the action of the springs 29, the inner ends of the dogs will be thrown outward away from the cylindric terminals, thus breaking or opening the starting winding circuit. When the rotor is at rest, the centrifugal dogs are held by their springs in contact with the respective cylindric terminals, thus closing the circuit in the starting windings of the stator. And when an electric current is supplied the rotor is thus started, and when a sufficient speed of the rotor is attained the centrifugal dogs are thrown out of contact with the cylindric terminals, thereby opening the starting circuit.

I claim:

1. A centrifugal switch including a spindle, two insulated cylindric terminals with an intervening collar co-axially fixed adjacent to and beyond the end of the spindle, an insulated disk secured on the spindle and having a central aperture clearing around the intervening collar, and two spring-controlled centrifugal dogs on the disk normally contacting the the respective terminals.

2. A centrifugal switch including a spindle, two insulated cylindric terminals with an intervening collar co-axially located adjacent to and beyond the end of the spindle, an insulated disk secured on the spindle and having a central aperture clearing around the intervening collar, and two spring-controlled centrifugal dogs on the disk normally contacting with the respective terminals.

3. A centrifugal switch including a spindle, two insulated cylindric terminals co-axially fixed adjacent to and beyond the end of the spindle, an insulated disk secured on the spindle, and two spring-controlled centrifugal dogs on the disk normally contacting with the respective terminals.

4. A centrifugal switch including a spindle, two insulated cylindric terminals co-axially located adjacent to and beyond the end of the spindle, an insulated disk secured on the spindle, and two spring-controlled centrifugal dogs on the disk normally contacting with the respective terminals.

5. A centrifugal switch including a spindle, two insulated cylindric terminals co-axially fixed adjacent to and beyond the end of the spindle, and two spring-controlled centrifugal dogs having an insulated movable connection with the spindle and normally contacting with the external periphery of the respective terminals.

6. A centrifugal switch including a spindle, two insulated cylindric terminals co-axially located adjacent to and beyond the end of the spindle, and two spring-controlled centrifugal dogs having an insulated movable connection with the spindle and normally contacting with the external periphery of the respective terminals.

CHARLES L. GOUGHNOUR.

Witnesses:
RAY F. KOHL,
RUTH A. MILLER.